US007147559B2

(12) United States Patent
Englman

(10) Patent No.: US 7,147,559 B2
(45) Date of Patent: Dec. 12, 2006

(54) MULTI-SPIN SLOT GAME WITH WIN MULTIPLIER

(75) Inventor: Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 316 days.

(21) Appl. No.: 10/162,543

(22) Filed: Jun. 4, 2002

(65) Prior Publication Data

US 2004/0038731 A1 Feb. 26, 2004

(51) Int. Cl.
*G06F 17/00* (2006.01)
*G06F 19/00* (2006.01)

(52) U.S. Cl. .......................................... 463/25; 463/20

(58) Field of Classification Search ............ 463/16–20, 463/25–27; 273/138.1, 143 R
See application file for complete search history.

(56) References Cited

U.S. PATENT DOCUMENTS

| | | | | |
|---|---|---|---|---|
| 5,393,061 | A * | 2/1995 | Manship et al. | 463/20 |
| 5,697,843 | A * | 12/1997 | Manship et al. | 463/20 |
| 6,004,207 | A * | 12/1999 | Wilson et al. | 463/20 |
| 6,033,307 | A | 3/2000 | Vancura | 463/20 |
| 6,059,289 | A | 5/2000 | Vancura | 273/143 R |
| 6,089,978 | A * | 7/2000 | Adams | 463/20 |
| 6,117,009 | A * | 9/2000 | Yoseloff | 463/20 |
| 6,142,873 | A * | 11/2000 | Weiss et al. | 463/20 |
| 6,149,521 | A * | 11/2000 | Sanduski | 463/13 |
| 6,328,649 | B1 * | 12/2001 | Randall et al. | 463/20 |
| 6,336,863 | B1 * | 1/2002 | Baerlocher et al. | 463/27 |
| 6,569,015 | B1 * | 5/2003 | Baerlocher et al. | 463/16 |
| 6,645,074 | B1 * | 11/2003 | Thomas et al. | 463/20 |
| 6,648,757 | B1 * | 11/2003 | Slomiany et al. | 463/20 |

OTHER PUBLICATIONS

Brochure, "Golden Canaries", Aristocrat Leisure Industries, Feb. 1994, two pages.

* cited by examiner

*Primary Examiner*—John M. Hotaling, II
*Assistant Examiner*—Milap Shah
(74) *Attorney, Agent, or Firm*—Jenkens & Gilchrist

(57) ABSTRACT

A wagering game is conducted on a gaming machine. The wagering game includes a basic game and a special feature triggered by a start-feature outcome in the basic game. In the special feature, the machine randomly selects a plurality of outcomes and provides a payout multiplier for each of the respective outcomes. Each of the outcomes includes a plurality of symbols placed in a symbol array. The payout multiplier for each of the respective outcomes is modified (e.g., increased) based on any occurrences of a predetermined symbol among the plurality of symbols included in a preceding one of the outcomes. The machine awards payouts for the respective outcomes according to a pay table and multiplies each payout by the respective payout multiplier.

31 Claims, 8 Drawing Sheets

MULTI-SPIN SLOT GAME WITH WIN MULTIPLIER

FIELD OF THE INVENTION

The present invention relates generally to wagering games conducted on gaming machines and, more particularly, to a multi-spin slot game including a win multiplier.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features and themes for bonus games to satisfy the demands of players and operators. Preferably, such new bonus game features and themes will maintain, or even further enhance, the level of player excitement offered by bonus games heretofore known in the art. The present invention is directed to satisfying these needs.

SUMMARY OF THE INVENTION

A wagering game is conducted on a gaming machine. In the wagering game, the machine randomly selects a plurality of outcomes and provides a payout multiplier for each of the respective outcomes. The payout multiplier for each of the respective outcomes is modified (e.g., increased) based on any occurrences of one or more predetermined symbols in a preceding one or more of the outcomes. The machine awards payouts for the respective outcomes according to a pay table and multiplies each payout by the respective payout multiplier.

BRIEF DESCRIPTION OF THE DRAWINGS

The foregoing and other advantages of the invention will become apparent upon reading the following detailed description and upon reference to the drawings in which.

Figure 1:
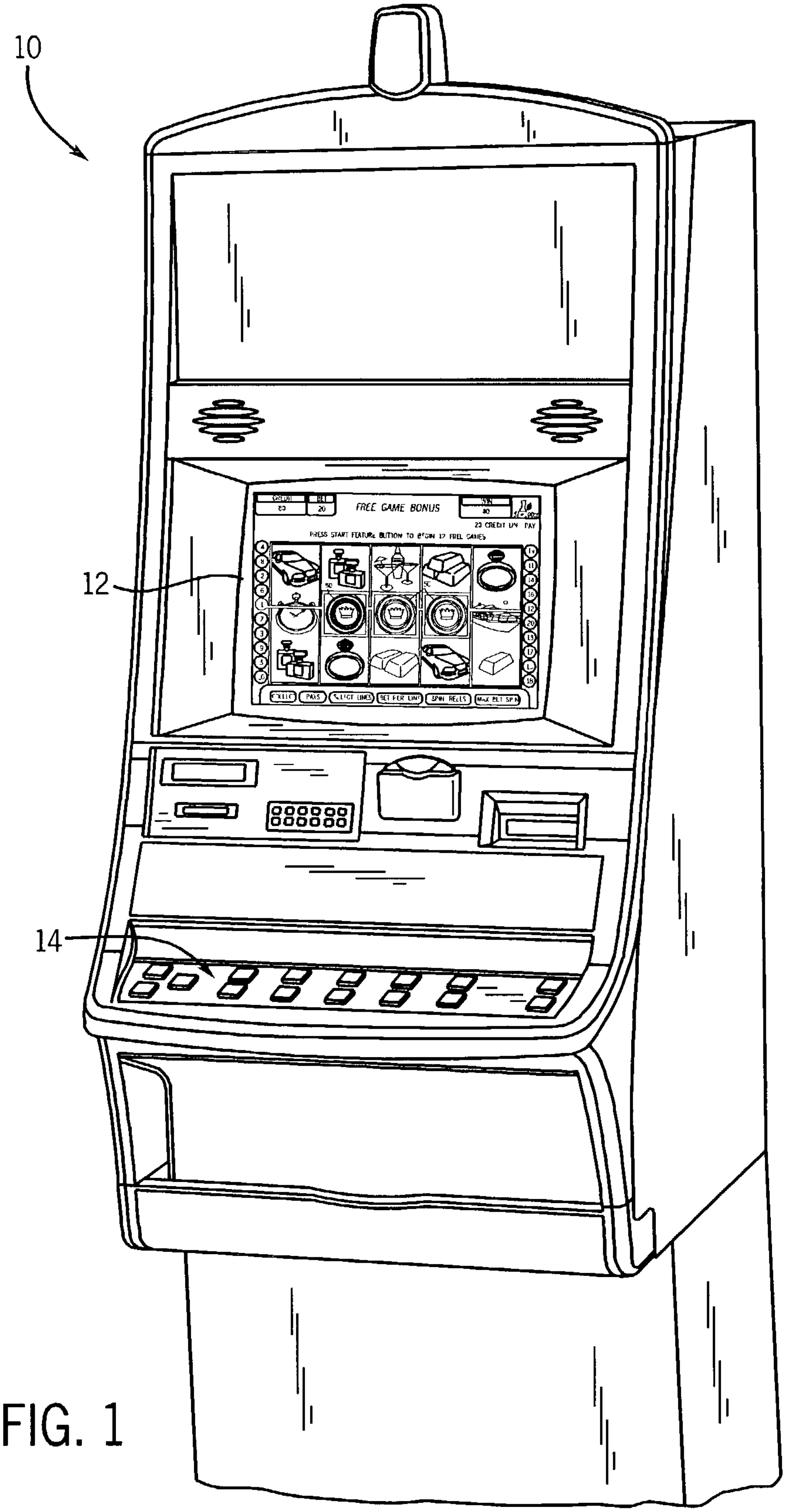
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a wagering game having a theme based on wealth and luxury. The wagering game features a basic slot game with five simulated spinning reels and a multiple free spin feature triggered by a start-feature outcome in the basic slot game. In addition to the multiple free spin feature, the basic slot game may produce certain outcomes for triggering other special features and bonus games. The gaming machine 10 includes a visual display 12 preferably in the form of a CRT, LCD, plasma, or other type of video display known in the art. The display 12 preferably includes a touch screen overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
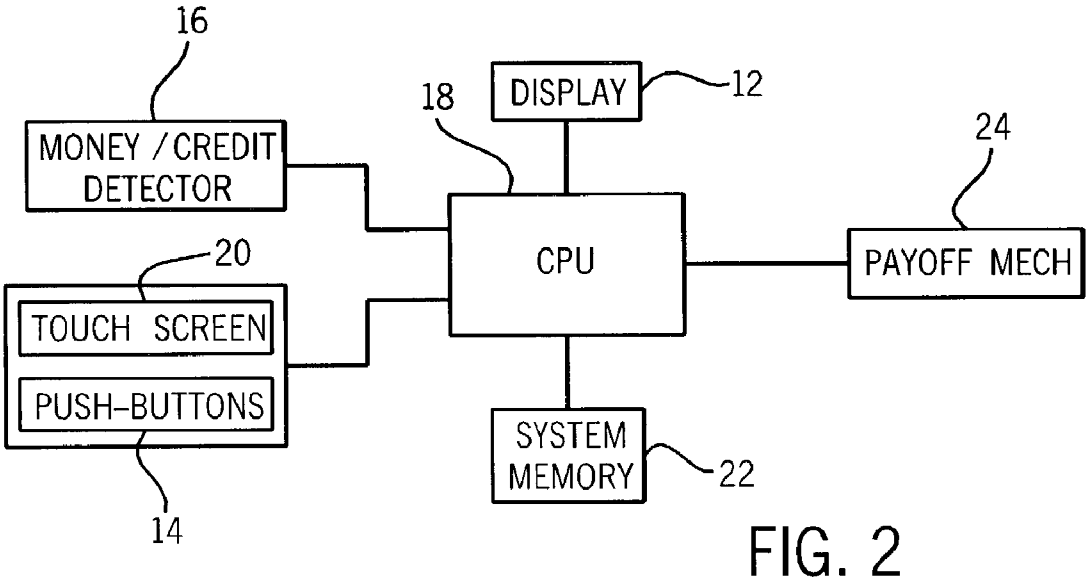
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, an amount to wager, and start game play via the touch screen 20 or the push-buttons 14, causing the CPU 18 to set the reels in motion, randomly select a game outcome, and then stop the reels to display symbols corresponding to the pre-selected game outcome. In one embodiment, one of the basic game outcomes triggers a multiple free spin feature.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or the multiple free spin feature. The payoff may be provided in the form of coins, bills, tickets, coupons, cards, etc. The payoff amounts are determined by one or more pay tables stored in the system memory 22.

Figure 3:
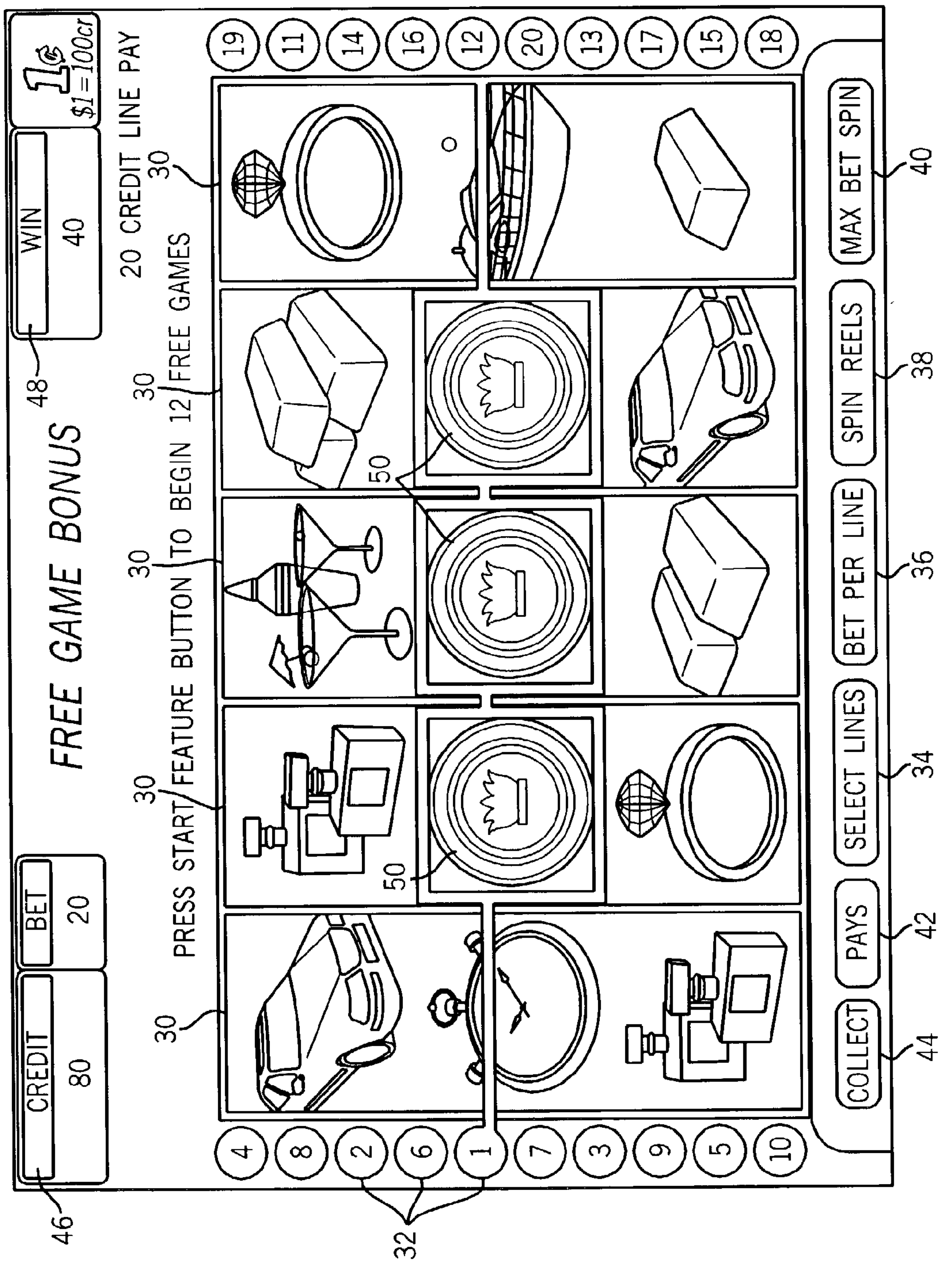
FIG. 3 is a display image associated with a basic slot game and showing a symbol combination for triggering a multiple free spin feature.

Referring to FIG. 3, the basic slot game is implemented on the display 12 on five video simulated spinning reels 30 with twenty pay lines 32. Each of the pay lines 32 extends through one symbol on each of the five reels 30. The number of reels 30 and the number of pay lines 32 may be varied from the illustrated example. Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 34 on the video display 12. The player then chooses the number of coins or credits to bet on the selected pay lines by pressing a "Bet Per Line" key 36.

After activation of the pay lines, the reels 30 may be set in motion by touching a "Spin Reels" key 38 or, if the player wishes to bet the maximum amount per line, by using a "Max Bet Spin" key 40 on the video display 12. Alternatively, other mechanisms such as, for example, a lever or push button may be used to set the reels in motion. The CPU uses a random number generator to select a game outcome (e.g., "basic" game outcome) corresponding to a particular set of reel "stop positions." The CPU then causes each of the video reels 30 to stop at the appropriate stop position. Video symbols are displayed on the reels 30 to graphically illustrate the reel stop positions and indicate whether the stop positions of the reels represent a winning game outcome. The symbols employed in the illustrated wagering game include a YACHT, CAR, RING, WATCH, PERFUME, WINE, TRIPLE GOLD BARS, DOUBLE GOLD BARS, SINGLE GOLD BAR, and DIAMOND. The DIAMOND symbol is wild for all symbols.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing a "Pays" key 42). The pay table may include both "pay line" wins and "scatter" wins.

A "pay line" win occurs when the symbols in a pay line win appearing on the reels 30 along an active pay line. A pay line win may, for example, include three or more matching symbols along an active pay line, where the payout is greater as the number of matching symbols along the active pay line increases. For a pay line win, the game credits the player an amount corresponding to the payout in the pay table for that pay line win multiplied by the number of credits bet on the winning pay line. One or more wild DIAMOND symbols in a pay line win further multiplies the payout for that win by two. In one implementation, pay line wins start from the leftmost reel and span adjacent reels (left to right). In an alternative implementation, pay line wins start from either the leftmost reel or the rightmost reel and span adjacent reels (left to right or right to left).

A "scatter" win occurs when the symbols in a scatter win appear anywhere on the reel display regardless of whether the symbols are along an active pay line. For a scatter win, the game credits the player an amount corresponding to the payout in the pay table for that scatter win multiplied by the total number of credits bet.

An example of pay table for the wagering game described herein is shown below:

| Pay Line Wins (left to right only) | Number on Pay Line | Payout | Scatter Wins | Number | Payout |
|---|---|---|---|---|---|
| Yacht | 5 | 5000 | Gold Coins | 5 | 100 |
| | 4 | 500 | | 4 | 15 |
| | 3 | 50 | | 3 | 2 |
| | 2 | 10 | | | |
| Car | 5 | 1000 | | | |
| | 4 | 200 | | | |
| | 3 | 30 | | | |
| | 2 | 5 | | | |
| Ring | 5 | 500 | | | |
| | 4 | 100 | | | |
| | 3 | 20 | | | |
| Watch | 5 | 200 | | | |
| | 4 | 75 | | | |
| | 3 | 15 | | | |
| Perfume | 5 | 150 | | | |
| | 4 | 50 | | | |
| | 3 | 10 | | | |
| Champagne | 5 | 120 | | | |
| | 4 | 30 | | | |
| | 3 | 10 | | | |
| Triple Bars | 5 | 100 | | | |
| | 4 | 25 | | | |
| | 3 | 5 | | | |
| Double Bars | 5 | 100 | | | |
| | 4 | 25 | | | |
| | 3 | 5 | | | |
| Single Bar | 5 | 100 | | | |
| | 4 | 20 | | | |
| | 3 | 5 | | | |

During a play of the wagering game, a credit meter 46 is decreased by a number of credit wagered and increased by a number of credits won. Any credits won during the play due to "pay line" wins and "scatter" wins are also shown on a win meter 48. The win meter 48 is reset to zero when a player places a wager to start a new play of the wagering game. After any play is concluded, the player may collect or "cash out" any credit remaining on the credit meter 46 by pressing a "Collect" button 44.

Included among the plurality of basic game outcomes is a start-feature outcome for triggering play of a multiple free spin feature. A start-feature outcome may be defined in any number of ways. For example, a start-feature outcome may occur when a special start-feature symbol or a special combination of symbols appears on one or more of the reels 30. The start-feature outcome may require the combination of symbols to appear along an active pay line, or may alternatively require that the combination of symbols appear anywhere on the display regardless of whether the symbols are along an active pay line. The appearance of the start-feature outcome causes the CPU to shift operation from the basic game to the multiple free spin feature of the present invention.

In the embodiment illustrated in FIG. 3, the appearance of three or more COIN symbols 50 anywhere in the reel display triggers the multiple free spin feature. In the free spin feature, the player is awarded twelve free spins of the reels 30. The number of free spins may be varied from the illustrated example. Also, the appearance of three or more COIN symbols 50 anywhere in the reel display during any free spin of the free spin feature adds twelve more free spins to the free spin feature.

Figure 4:
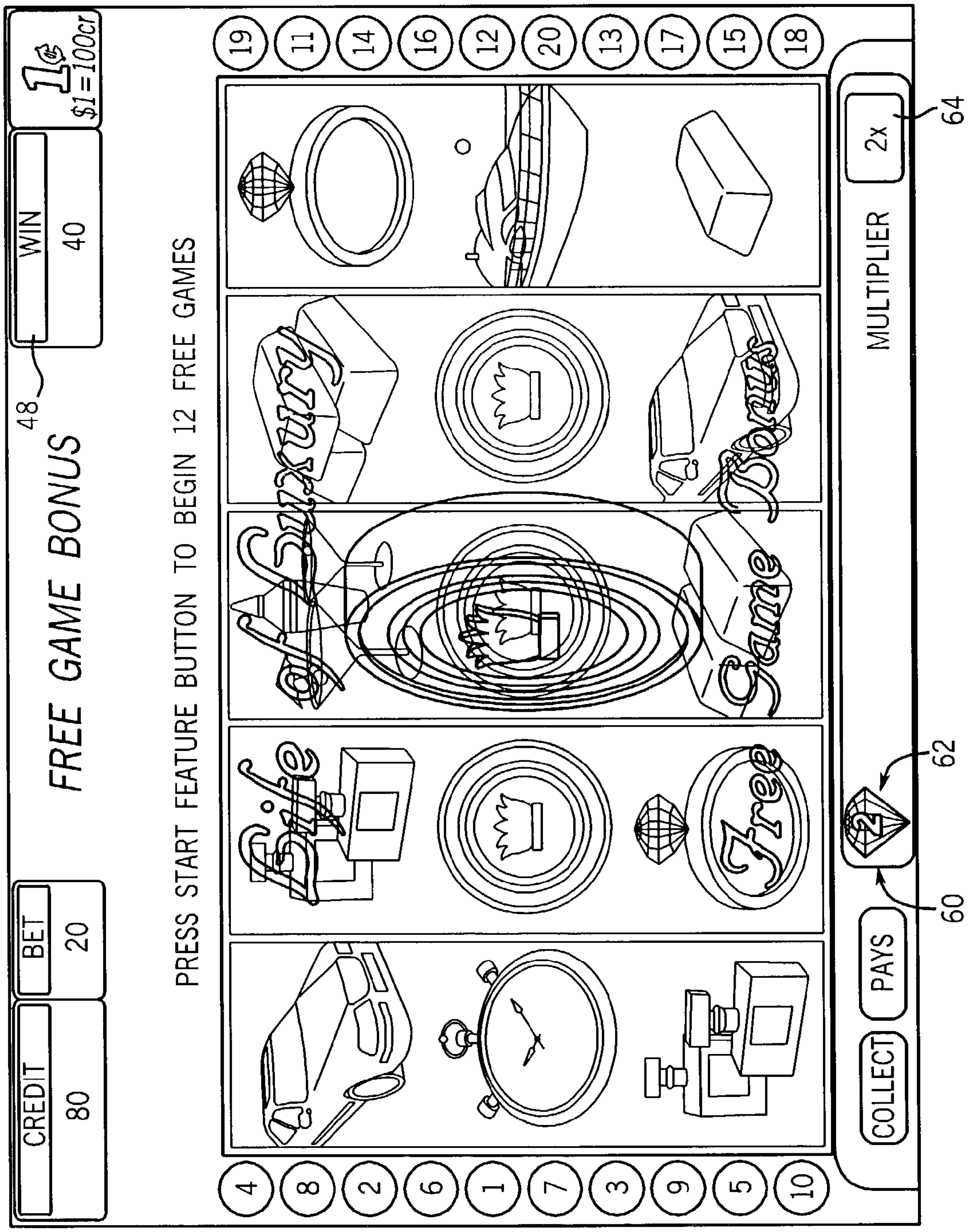
FIG. 4 is a display image showing a transition from the basic slot game to the multiple free spin feature.

Referring to FIG. 4, the display prompts the player to press a "start feature" button on the button panel 14 (see FIG. 1) to start the multiple free spin feature. The display depicts a multiplier meter 60 including a diamond accumulator 62 and a multiplier window 64. Any wins during the free spin feature are multiplied by the "win" multiplier in the multiplier window 64 just prior to the reel spin that yielded the win. The win multiplier starts at two prior to the first spin in the free spin feature. This is denoted by the value "2×" in the multiplier window 64 and a single large diamond in the accumulator 62 with a "2" superimposed thereon. During the free spin feature, the win multiplier increases by one for each DIAMOND symbol appearing on the reel display.

Figure 5:
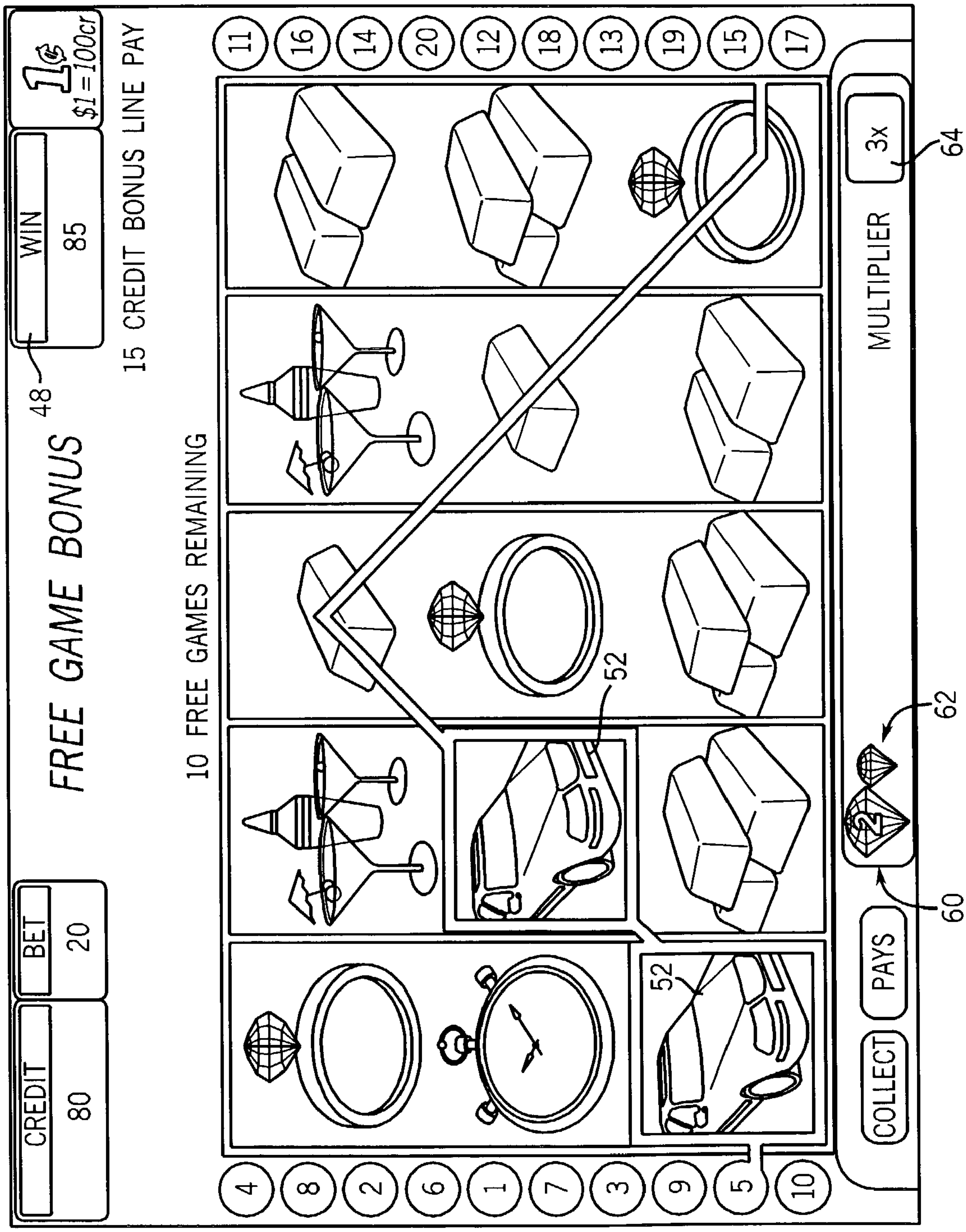
FIGS. 5, 6, 7, and 8 are display images associated with the multiple free spin feature and providing an example of how the free spin feature proceeds.

FIGS. 5 through 8 provide an example of how the multiple free spin feature proceeds. Referring to FIG. 5, the display indicates that ten of the twelve free spins remain. Prior to the second free spin, the win multiplier is at three. This is denoted by the value "3×" in the multiplier window 64 and the large diamond and one small diamond in the accumulator 62. The second free spin results in three different pay line wins each having two CAR symbols 52. According to the pay table provided above, a pay line win of two CAR symbols 52 yields a payout of 5 credits per credit wagered on the winning pay line. Therefore, for a wager of one credit per pay line and a win multiplier of three, the second free spin yields a total award of 45 credits:

| Win | Payout | Wild DIAMOND Multiplier (2×)* | Win Multiplier | Award |
|---|---|---|---|---|
| two CAR | 5 | No | 3 | 15 |
| two CAR | 5 | No | 3 | 15 |
| two CAR | 5 | No | 3 | 15 |
| | | | | Total Award = 45 Credits |

*One or more wild DIAMOND symbols in a pay line win further multiplies the payout for that win by two The total award of 45 credits is added to the win meter 48. No DIAMOND symbols appeared on the reel display during the second free spin, so the win multiplier in the multiplier window 64 remains at three.

Figure 6:
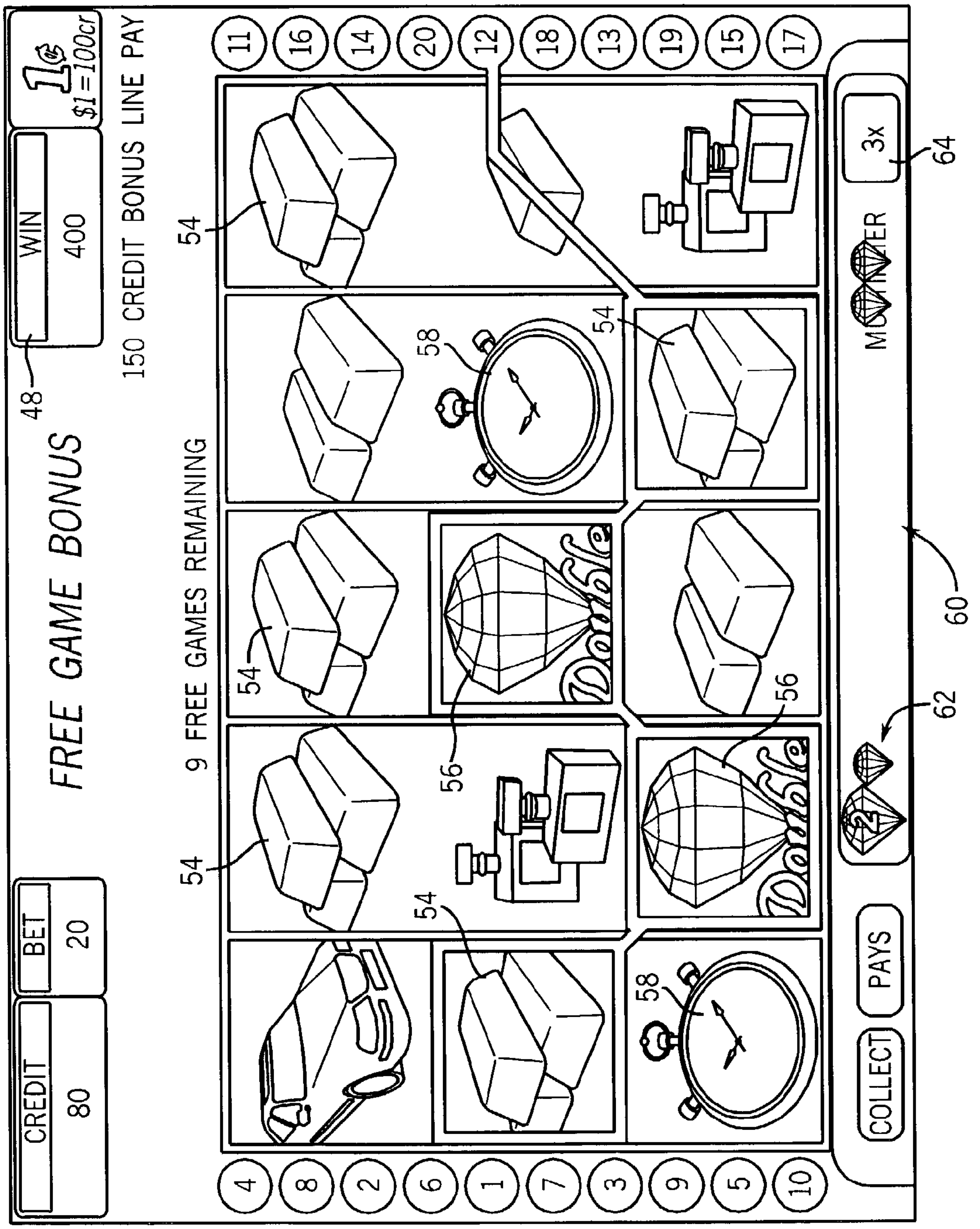

Referring to FIG. 6, the display indicates that nine of the twelve free spins remain. Prior to the third free spin, the win multiplier is still at three. The third free spin results in five different pay line wins: (1) four TRIPLE BAR symbols 54, including two wild DIAMOND substitutes 56, yielding a pay line win of 25 credits per credit wagered on the winning pay line; (2) three TRIPLE BAR symbols 54 yielding a pay line win of 5 credits per credit wagered on the winning pay line; (3) three TRIPLE BAR symbols 54, including one wild DIAMOND substitute 56, yielding a pay line win of 5 credits per credit wagered on the winning pay line; (4) three WATCH symbols 58, including two wild DIAMOND substitutes 56, yielding a pay line win of 15 credits per credit wagered on the winning pay line; and (5) two CAR symbols 52, including one wild DIAMOND substitute 56, yielding a pay line win of 5 credits per credit wagered on the winning pay line. Because pay line wins (1), (3), (4), and (5) each include one or more wild DIAMOND substitutes 56, the payout for each of these four wins is further multiplied by two. Therefore, for a wager of one credit per pay line and a win multiplier of three, the third free spin yields a total award of 315 credits:

| Win | Payout | Wild DIAMOND Multiplier (2×)?* | Win Multiplier | Award |
|---|---|---|---|---|
| four TRIPLE BAR | 25 | Yes | 3 | 150 |
| three TRIPLE BAR | 5 | No | 3 | 15 |
| three TRIPLE BAR | 5 | Yes | 3 | 30 |
| three WATCH | 15 | Yes | 3 | 90 |
| two CAR | 5 | Yes | 3 | 30 |
| | | | | Total Award = 315 Credits |

*One or more wild DIAMOND symbols in a pay line win further multiplies the payout for that win by two The total award of 315 credits is added to the win meter 48. Two DIAMOND symbols 56 appeared on the reel display during the third free spin, so the win multiplier in the multiplier window 64 is increased to five from three prior to the next free spin. The impending increase in the win multiplier is denoted by the two small diamonds on the far right of the diamond accumulator 62 superimposed over the word "multiplier".

Figure 7:
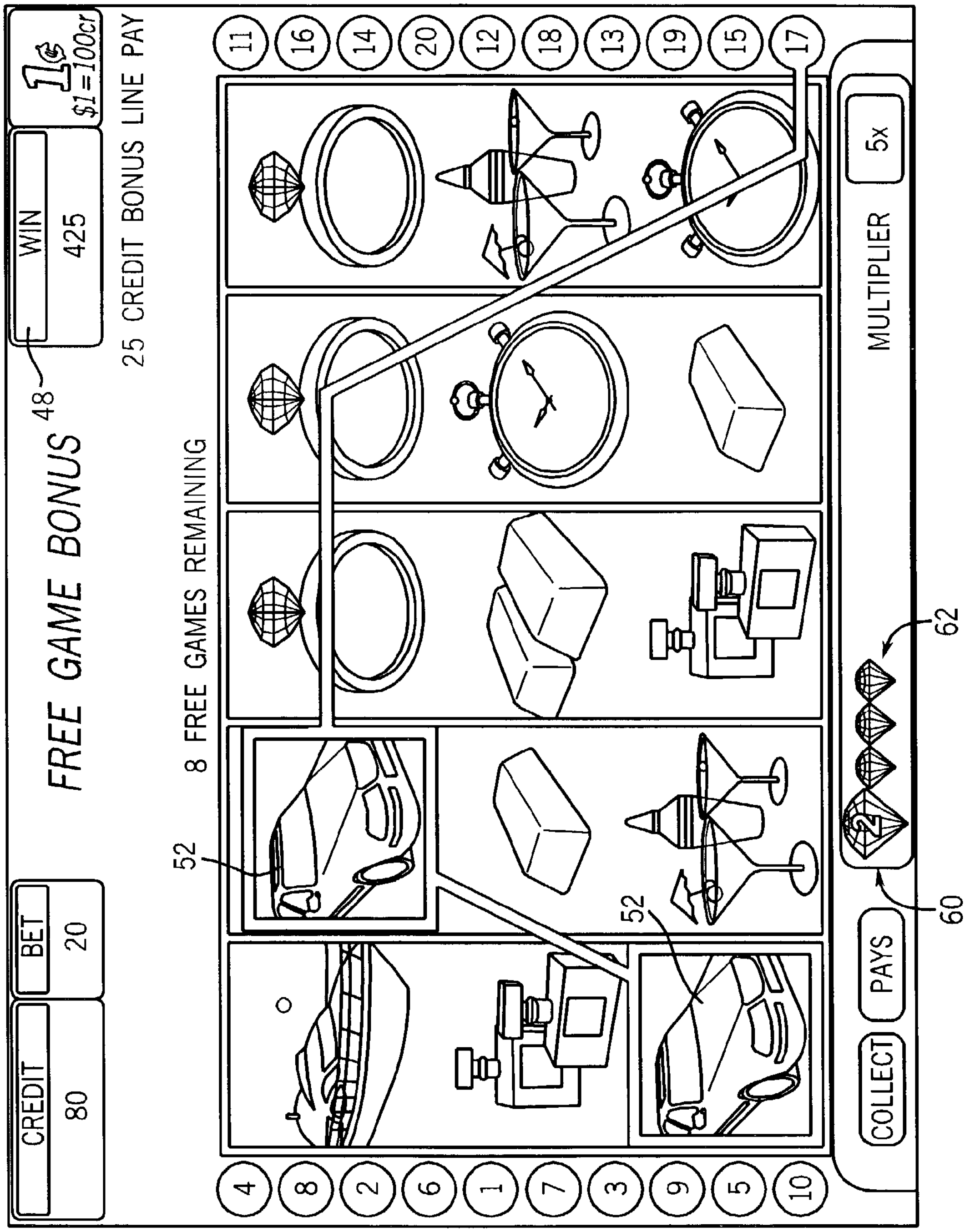

Referring to FIG. 7, the display indicates that eight of the twelve free spins remain. Prior to the fourth free spin, the win multiplier is at five. This is denoted by the value "5×" in the multiplier window 64 and the large diamond and three small diamonds in the accumulator 62. The fourth free spin results in a single pay line win having two CAR symbols 52. According to the pay table provided above, a pay line win of two CAR symbols 52 yields a payout of 5 credits per credit wagered on the winning pay line. Therefore, for a wager of one credit per pay line and a win multiplier of five, the fourth free spin yields a total award of 25 credits:

| Win | Payout | Wild DIAMOND Multiplier (2x)* | Win Multiplier | Award |
|---|---|---|---|---|
| two CAR | 5 | No | 5 | 25 |
| | | | | Total Award = 25 Credits |

*One or more wild DIAMOND symbols in a pay line win further multiplies the payout for that win by two The total award of 25 credits is added to the win meter 48. No DIAMOND symbols appeared on the reel display during the fourth free spin, so the win multiplier in the multiplier window 64 remains at five.

Figure 8:
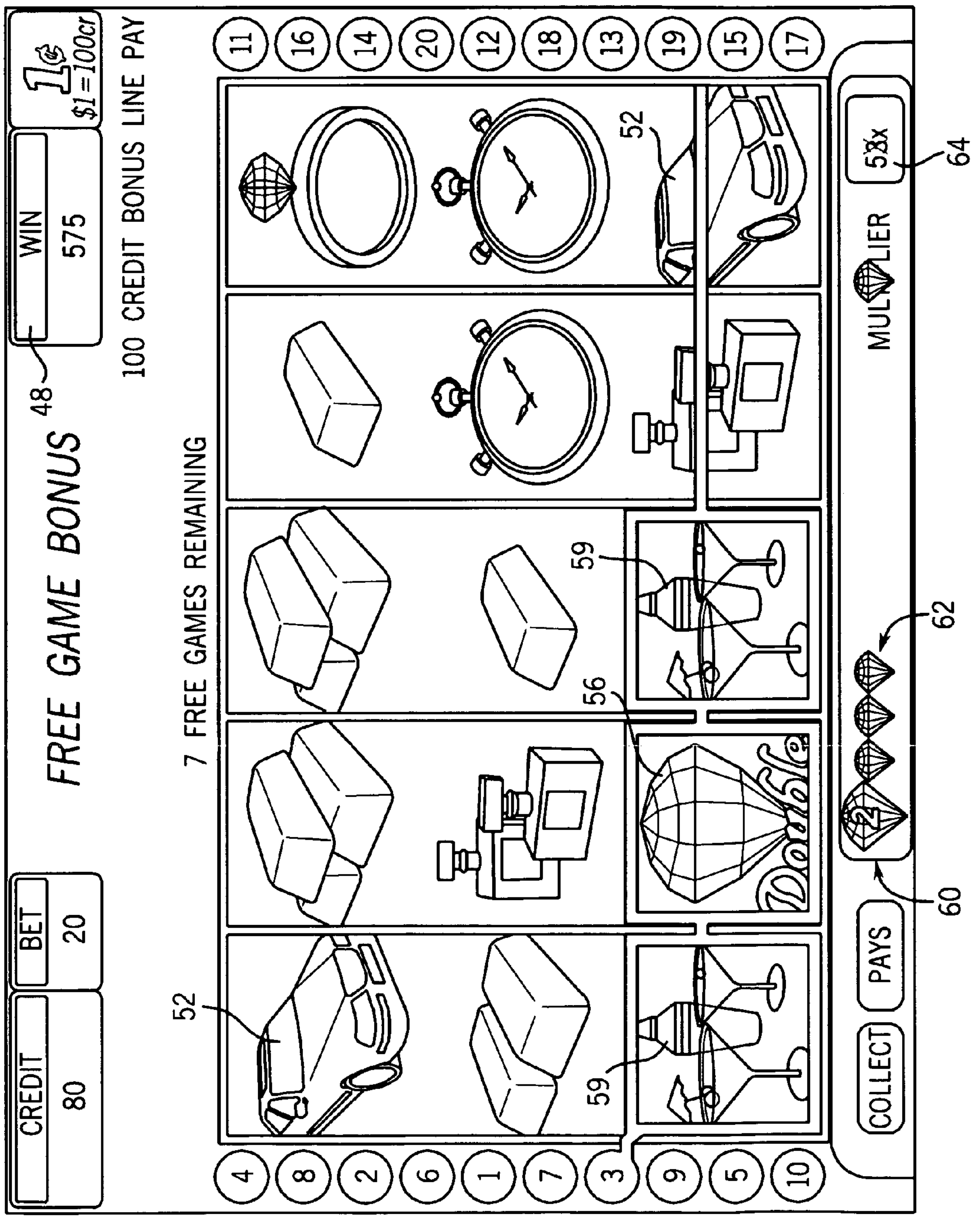

Referring to FIG. 8, the display indicates that seven of the twelve free spins remain. Prior to the fifth free spin, the win multiplier is still at five. The fifth free spin results in two different pay line wins: (1) three CHAMPAGNE symbols 59, including one wild DIAMOND substitute 56, yielding a pay line win of 10 credits per credit wagered on the winning pay line; and (2) two CAR symbols 52, including one wild DIAMOND substitute 56, yielding a pay line win of 5 credits per credit wagered on the winning pay line. Because both pay line wins include a wild DIAMOND symbol 56, the payout for each of these two wins is further multiplied by two. Therefore, for a wager of one credit per pay line and a win multiplier of five, the fifth free spin yields a total award of 150 credits:

| Win | Payout | Wild DIAMOND Multiplier (2×)?* | Win Multiplier | Award |
|---|---|---|---|---|
| three CHAMPAGNE | 10 | Yes | 5 | 100 |
| two CAR | 5 | Yes | 5 | 50 |
| | | | Total Award = 150 Credits | |

*One or more wild DIAMOND symbols in a pay line win further multiplies the payout for that win by two The total award of 150 credits is added to the win meter 48. One DIAMOND symbol 56 appeared on the reel display during the fifth free spin, so the win multiplier in the multiplier window 64 is increased to six from five prior to the next free spin. The impending increase in the win multiplier is denoted by one small diamond on the far right of the diamond accumulator 62 superimposed over the word "multiplier".

The multiple free spin feature continues in the above manner until no more free spins remain. When no more free spins remain, the CPU shifts operation from the free spin feature back to the basic slot game requiring another wager from the player.

While the present invention has been described with reference to one or more particular embodiments, those skilled in the art will recognize that many changes may be made thereto without departing from the spirit and scope of the present invention.

For example, instead of just increasing the win multiplier based on occurrences of a predetermined symbol like the DIAMOND symbol, provision may be made to also decrease the win multiplier based on occurrences of another predetermined symbol.

In addition, the win multiplier need not vary based on a one-to-one correspondence to the number of occurrences of the predetermined symbol, but rather could change based on some other correspondence to the number of occurrences of the predetermined symbol. Each occurrence may, for example, increase or multiply the win multiplier by a fixed number other than one, such as two. Alternatively, each occurrence may increase the win multiplier by a variable number such as one on the first occurrence, two on the second occurrence, three on the third occurrence, and so on.

Furthermore, instead of varying the win multiplier baed on occurrences of an individual symbol like the DIAMOND symbol, the win multiplier may be varied based on occurrences of predetermined combinations of symbols.

Finally, the win multiplier may be used in the basic slot game, instead of or in addition to in the multiple free spin feature. If the win multiplier is used in the basic slot game, the win multiplier would persist over the course of multiple plays of the wagering game and, for example, be reset to one based on some criteria (e.g., after every N number of plays, after a predetermined reset symbol or symbol combination, and/or after triggering a special feature). The win multiplier may also be reset to one when a player cashes out and leaves the gaming machine.

Each of these embodiments and obvious variations thereof is contemplated as falling within the spirit and scope of the claimed invention, which is set forth in the following claims.

What is claimed is:

1. A method of conducting a wagering game on a gaming machine, comprising:

receiving a wager from a player;

randomly selecting a plurality of outcomes;

providing a payout multiplier for each of the respective outcomes, the payout multiplier for each of the respective outcomes being directly modified based on every single occurrence of one or more predetermined symbols in an immediately preceding one of the outcomes;

awarding payouts for the respective outcomes according to a pay table; and multiplying each payout by the respective payout multiplier, wherein the payout multiplier is a factor other than one.

2. The method of claim 1, further including representing each of the outcomes with a plurality of symbols placed in a symbol array.

3. The method of claim 2, wherein the symbol array includes a plurality of rows and columns.

4. The method of claim 3, wherein the step of representing each of the outcomes with a plurality of symbols placed in a symbol array includes rotating and stopping a plurality of symbol-bearing reels to place the symbols on the reels in visual association with the symbol array.

5. The method of claim 1, wherein the payout multiplier for each of the respective outcomes is increased based on a number of occurrences of a single predetermined symbol in an immediately preceding one of the outcomes.

6. The method of claim 5, wherein the payout multiplier for each of the respective outcomes is increased by one for each occurrence of the single predetermined symbol in the immediately preceding one of the outcomes.

7. The method of claim 1, wherein the payout multiplier begins at two for an initial one of the outcomes.

8. The method of claim 1, further including conducting a basic game, wherein the step of randomly selecting a plurality of outcomes is triggered by a special event in the basic game.

9. A method of conducting a wagering game on a gaming machine, comprising:

receiving a wager from a player;

randomly selecting a plurality of outcomes, each of the outcomes including a plurality of symbols placed in a symbol array;

providing a payout multiplier for each of the respective outcomes;

increasing the payout multiplier for a current outcome in response to every single occurrence of one or more predetermined multiplier-increasing symbols among the plurality of symbols in a preceding outcome;

decreasing the payout multiplier for the current outcome in response to every single occurrence of one or more predetermined multiplier-decreasing symbols among the plurality of symbols in a preceding outcome;

awarding payouts for the respective outcomes according to a pay table; and multiplying each payout by a respective payout multiplier after a respective outcome has been selected and before a subsequent outcome has been selected, the respective payout multiplier excluding any occurrences of the one or more predetermined multiplier-increasing symbols and the one or more predetermined multiplier-decreasing symbols in the current outcome.

10. The method of claim 9, wherein the symbol array includes a plurality of rows and columns.

11. The method of claim 10, wherein the plurality of symbols are placed in the symbol array by rotating and stopping a plurality of symbol-bearing reels.

12. The method of claim 9, wherein the payout multiplier for each of the respective outcomes is increased based on a number of occurrences of a single predetermined multiplier-increasing symbol among the plurality of symbols included in an immediately preceding one of the outcomes.

13. The method of claim 12, wherein the payout multiplier for each of the respective outcomes is increased by one for each occurrence of the single predetermined multiplier-increasing symbol among the plurality of symbols in the immediately preceding one of the outcomes.

14. The method of claim 9, wherein the payout multiplier begins at two for an initial one of the outcomes.

15. The method of claim 9, further including conducting a basic game, wherein the step of randomly selecting a plurality of outcomes is triggered by a special event in the basic game.

16. A method of conducting a wagering game on a gaming machine, comprising:

receiving a wager from a player;

conducting a basic game; and conducting a special feature in response to a start-feature outcome in the basic game, the special feature including:

randomly selecting a plurality of outcomes, each of the outcomes including a plurality of symbols placed in a symbol array;

providing a payout multiplier for each of the respective outcomes, the payout multiplier for each of the respective outcomes increasing only in response to every single occurrence of one or more predetermined multiplier-increasing symbols among the plurality of symbols in a preceding outcome;

awarding payouts for the respective outcomes according to a pay table; and multiplying each payout by the respective payout multiplier to provide the player with respective bonus payouts whose values are different than respective values of the awarded payouts.

17. A gaming machine for conducting a wagering game, comprising:

a wagering apparatus for receiving a wager from a player; and a control unit for randomly selecting a plurality of outcomes;

providing a payout multiplier for each of the respective outcomes, the payout multiplier for each of the respective outcomes being directly modified based only on every single occurrence of one or more predetermined symbols in an immediately preceding one of the outcomes;

awarding payouts for the respective outcomes according to a pay table; and multiplying each payout by the respective payout multiplier, wherein the payout multiplier is a factor other than one.

18. The machine of claim 17, each of the outcomes includes a plurality of symbols placed in a symbol array.

19. The machine of claim 18, wherein the symbol array includes a plurality of rows and columns.

20. The machine of claim 19, wherein the plurality of symbols are placed in the symbol array by rotating and stopping a plurality of symbol-bearing reels.

21. The machine of claim 17, wherein the payout multiplier for each of the respective outcomes is increased based on a number of occurrences of a single predetermined symbol in an immediately preceding one of the outcomes.

22. The machine of claim 21, wherein the payout multiplier for each of the respective outcomes is increased by one for each occurrence of the single predetermined symbol in the immediately preceding one of the outcomes.

23. The machine of claim 17, wherein the payout multiplier begins at two for an initial one of the outcomes.

24. A method of conducting a wagering game on a gaming machine, comprising:

receiving a wager from a player;

conducting a basic game; and conducting a special feature in response to a start-feature outcome in the basic game, the special feature including:

randomly selecting a first outcome from a plurality of outcomes, said first outcome having a first plurality of symbols placed in a symbol array;

providing a first payout multiplier for said first outcome, said first payout multiplier being a predetermined number;

randomly selecting a second outcome from said plurality of outcomes, said second outcome having a second plurality of symbols placed in a symbol array;

providing a second payout multiplier for said second outcome, said second payout multiplier being modified based only on every single occurrence of one or more predetermined symbols among the plurality of symbols included in said first plurality of symbols;

awarding payouts for the respective outcomes according to a pay table; and multiplying each payout by the respective payout multiplier, wherein the payout multiplier is a factor other than one.

25. The method of claim 24, the special feature further including:

randomly selecting a next outcome from said plurality of outcomes, said next outcome having a next plurality of symbols placed in a symbol array;

providing a next payout multiplier for said next outcome, said next payout multiplier being modified based on every single occurrence of one or more predetermined symbols among the plurality of symbols included in said second plurality of symbols; and repeating said randomly selecting a next outcome step and said providing a next payout multiplier for said next outcome step for additional outcomes from said plurality of outcomes until an end-feature outcome is reached.

26. A method of conducting a wagering game on a gaming machine, comprising:

receiving a wager from a player;

randomly selecting a free-spins outcome from a plurality of outcomes, said free-spins outcome triggering a plurality of free spins;

providing a payout multiplier for each of said plurality of free spins, the payout multiplier being modified for a current one of the free spins based on any occurrences of one or more predetermined symbols in an immediately preceding one of the free spins;

awarding payouts for the respective outcomes according to a pay table; and multiplying each payout by the respective payout multiplier after a respective one of the free spins has been selected and before a subsequent one of the free spins has been selected, the respective payout multiplier excluding any occurrences of the one or more predetermined symbols in the current one of the free spins, the payout multiplier being a factor other than one.

27. The method of claim 26, further including representing each of the plurality of free spins with a plurality of symbols placed in a symbol array.

28. The method of claim 27, wherein the symbol array includes a plurality of rows and columns.

29. The method of claim 28, wherein the step of representing each of the plurality of free spins with a plurality of symbols placed in a symbol array includes rotating and stopping a plurality of symbol-bearing reels to place the symbols on the reels in visual association with the symbol array.

30. The method of claim 26, wherein the payout multiplier for each of said plurality of free spins is increased based on a number of occurrences of a single predetermined symbol in an immediately preceding one of the outcomes.

31. The method of claim 26, wherein the payout multiplier for each of said plurality of free spins is increased by one for each occurrence of the single predetermined symbol in the immediately preceding one of the outcomes.

* * * * *